(12) United States Patent
Dreux et al.

(10) Patent No.: US 12,091,356 B2
(45) Date of Patent: Sep. 17, 2024

(54) AUTOMOTIVE GLAZING HAVING SUPERIOR OPTICAL QUALITY

(71) Applicant: AGC GLASS EUROPE, Louvain-la-Neuve (BE)

(72) Inventors: Priscille Dreux, Saint Saulve (FR); Fabien Descamps, Gosselies (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 243 days.

(21) Appl. No.: 17/429,755

(22) PCT Filed: Feb. 12, 2020

(86) PCT No.: PCT/EP2020/053568
§ 371 (c)(1),
(2) Date: Aug. 10, 2021

(87) PCT Pub. No.: WO2020/165232
PCT Pub. Date: Aug. 20, 2020

(65) Prior Publication Data
US 2022/0127187 A1    Apr. 28, 2022

(30) Foreign Application Priority Data
Feb. 13, 2019   (EP) ..................................... 19156943

(51) Int. Cl.
*C03C 17/34* (2006.01)
*B32B 17/10* (2006.01)
*C03C 23/00* (2006.01)

(52) U.S. Cl.
CPC .......... *C03C 17/34* (2013.01); *B32B 17/1033* (2013.01); *B32B 17/10348* (2013.01);
(Continued)

(58) Field of Classification Search
CPC ........ B32B 17/10036; B32B 17/40348; B32B 17/1033; C03C 23/007; C03C 17/34
See application file for complete search history.

(56) References Cited

U.S. PATENT DOCUMENTS 5,414,240 A * 5/1995 Carter ............... B32B 17/10174
219/547
2002/0176988 A1* 11/2002 Medwick ................ C03C 17/38
428/521
(Continued)

FOREIGN PATENT DOCUMENTS

EP           2 986 576 A1    2/2016
WO   WO-2005068381 A1 * 7/2005 ......... C03B 23/0258
(Continued)

OTHER PUBLICATIONS

International Search Report issued on May 13, 2020 in PCT/EP2020/053568 filed on Feb. 12, 2020.

*Primary Examiner* — Nathan H Empie
(74) *Attorney, Agent, or Firm* — Oblon, McClelland, Maier & Neustadt, L.L.P.

(57) ABSTRACT

A method for producing an automotive glazing with an optical sensor device, with the glazing having superior optical qualities, including the steps of applying an enamel obscuration mask on at least one face of at least one glass sheet, where the obscuration mask extends to an area where the at least one optical sensor device will be fixed and includes at least one opening on the automotive interior side so as to be capable of acquiring information through the opening from the optical sensor device intended to be fixed at the at least one opening; drying or firing the enamel obscuration mask; applying a washable cover layer resisting at a temperature of at least 620° C. on the surface of the at least one opening; submitting the glass sheet to a heat (Continued)

treatment above 450° C. during a bending or tempering process; and removing by washing the washable cover layer.

10 Claims, 5 Drawing Sheets

(52) U.S. Cl.
CPC ...... *C03C 23/007* (2013.01); *B32B 17/10036* (2013.01); *B32B 17/10981* (2013.01); *B32B 2305/34* (2013.01); *C03C 2218/112* (2013.01); *C03C 2218/119* (2013.01); *C03C 2218/328* (2013.01); *C03C 2218/34* (2013.01); *C03C 2218/355* (2013.01)

(56) References Cited

U.S. PATENT DOCUMENTS

| | | |
|---|---|---|
| 2004/0086652 A1 | 5/2004 | Degand |
| 2016/0068431 A1 | 3/2016 | Leroy et al. |

FOREIGN PATENT DOCUMENTS

| | | | | |
|---|---|---|---|---|
| WO | WO-2017115041 A1 * | 7/2017 | ....... | B32B 17/10036 |
| WO | WO 2018/122770 A1 | 7/2018 | | |

* cited by examiner

AUTOMOTIVE GLAZING HAVING SUPERIOR OPTICAL QUALITY

The invention relates to glazing comprising patterns limiting the light transmission. More particularly, the invention relates to glazing comprising patterns limiting the light transmission and an optical sensor such as, for example, a camera, an infrared camera, a Lidar, a laser pointer etc. A wide part of automotive glazings comprises enameled patterns intended to mask unsightly elements, in particular glue joints, electrical connections and in particular those linked to a camera arranged on the glazing, etc. These patterns are for example obtained by applying a composition comprising a glass frit, pigments and a carrier in which the frit and the pigments are suspended. The application of these enamel compositions is followed by a high-temperature curing which melts the frit and fixes the enamel to the support.

If a large part of the automotive glazing units comprises such patterns, architectural or industrial glazing units, may also have such patterns very strongly limiting light transmission. For this reason, even if the invention is first intended for application to motor vehicle glazing units, it also relates to the other types of glazing and generally all the applications of patterns on glass sheets. In particular, when the glazings have in their constitution or in their implementation, constraints, in particular in terms of thermal processing or image capture.

For simplification, in the following description, it is referred to automotive glazings, being understood that does not limit the object of the invention.

Usually, the application of the enamel patterns to the glass is carried out by screen printing technique. The applied composition is dried to remove the majority of the carrier, and, is subjected to curing for fixing the components to the glass sheet. The curing of the enamel composition can be carried out during a sheet-forming/bending treatment. The temperature conditions in which the forming takes place, whether it is tempering or bending, are such that the melting temperature of the frit is largely exceeded.

Furthermore, the presence of the enamel composition on a glass sheet leads to various difficulties in implementing these bending/tempering operations, by locally modifying the thermal behavior of the sheet. The presence of the enamel results in a substantial difference in absorption of the thermal radiation, causing, locally, differences in the forming/bending kinetics. These differences, if not taken into account in the processing conditions, result in irregularities in the forming.

Thus, an issue arises from the thermal gradients that occur during the bending process. As one would expect, the black frit absorbs more radiant heat than the clear glass. Radiant heat is the predominant heat source used for glass bending. The black frit areas of the glass run hotter than the adjacent clear areas. With glass being a poor conductor of heat, gradients in the tens of degrees centigrade can arise over a short distance. These high abrupt thermal gradient on the surface result in optical distortion and high residual along the inner edge of the black band. This is known as the "burn" line in the industry. This can often be seen along the edges of the black obscuration mask (also the "black band" or "obscuration band") found along the edges of most windshields.

Today, as the electronic content of modern vehicles has increased, the area of the windshield, near the top center, has become increasingly crowded on many vehicles. Within the zone rear-view mirror, it is found a wide array of equipment mounted in this location.

One of the first devices to compete for this area was the infrared rain sensor use to provide for a full automatic mode of windshield wiper operation as well as other vehicle functions such as closing the sun roof . . . .

The use of cameras, requiring a wide field of view and a high level of optical clarity, is also growing at a rapid rate with the introduction of vehicles capable of various levels of autonomous operation. The resolution of the cameras is also increasing at an equally fast rate. These typically must be mounted on the windshield in the what it is called the "camera zone". Today, camera based systems are used to provide a wide array of safety functions including adaptive cruise control, obstacle detection, lane departure warning and support for autonomous operation. Many of these applications require the use of multiple cameras. A clear undistorted field of view is especially critical for camera based systems to perform as intended. It is essential for these systems to be able to quickly differentiate between objects, capture text, identify signage, and operate with minimal lighting. Further, as the resolution of the cameras used increases the need for a clear distortion free field of view increases.

Conventionally, laminated glazing for a motor vehicle are printed with an over the entire periphery of the edges of the glazing and glazing in the integration zone of the face 2 and/or face 4 sensors, to form a masking strip, in order, on the one hand, to protect the bonding system from UV radiation, elements added to glazing such as connectors, heating networks, brackets, etc. And on the other hand to mask these elements as well as to mask the cameras, the other optical detectors such as rain sensors etc.

Thus, the purpose of the band is double, on the one hand, the aesthetic, because of the outside, all these elements are not visible, on the other hand, to prevent damage to the glue induced by exposure to solar radiation.

Generally, the printing used is screen printing of enamel. In effect, the enamel makes it possible to provide the required optical qualities and a sufficient masking of elements such as those mentioned above.

In a laminate, the enamel is screen-printed on the inside of the glass sheet intended for the external position, ie in contact with the atmosphere, referred to as the side 2, and/or on the outside of the glass sheet for the inner position, referred to as the face 4, which is in contact with the internal atmosphere, in particular of the passenger compartment of a vehicle.

Thus, for glass mounted with optical sensor device and more particularly camera systems, there is a need to limit even to eliminate the optical distortion in what it is called generally the "camera zone" ie the place on the surface of the glazing wherein an optical sensor such as for example a camera, an infrared camera, a Lidar, or a laser pointer is placed. Commonly, an optical sensor such as for example a camera, an infrared camera, a Lidar, or a laser pointer, is disposed in the vicinity of the interior rearview mirror within a zone free of black band (the camera zone). This obscuration band of black enamel frit that encircles the day light opening is commonly called the "black band". It is understood that the optical sensor can be arranged in another area than in the vicinity of the rear-view mirror. The optical sensor device may be arranged, for example, in an area in the periphery of the glazing or in any other zone capable of receiving such a sensor, in a place outside the field of view of the driver or the passenger.

Another problem is surface mismatch. In the case of a laminate glazing and more particularly a windshield, the laminate comprises at least two glass sheets. The frit is typically applied to one or two of the glass sheets. This can result is a slight difference in the shape of the surfaces. When the two glass sheets are pressed together during lamination, the mismatch results in residual stress in the laminate and optical distortion.

The difficulties of the type indicated above are well known. Solutions to overcome or at least to reduce the drawbacks cited above are known for glazings without a complex shape. For the very complex shapes, it is often necessary to form/bend the sheets by means of partial pressing which necessarily results in contact with the enameled portions.

Standard practice has been to extend the black enamel frit band to create an obscuration on a surface with openings in the obscuration to provide for the required field of view for the optical sensor device.

When the black enamel frit band is extended downward from the top center black band to create an obscuration with at least one opening, optical distortion and stress can become a major problem. This is because the black frit is extending further from the edge into the area that where more heat must be applied to bend the glass.

SUMMARY OF THE INVENTION

To avoid these difficulties and meet masking requirements, the invention proposes to provide a laminated glazing having superior optical quality. Another object of the present invention is to provide a method for reducing the optical distortion in a glazing comprising an obscuration mask of black enamel frit that encircles at least a day light opening for an optical sensor device.

One object of the present invention is to provide a A method for producing an automotive glazing comprising an optical sensor device characterized in that the method comprises the following steps:
  provide at least one glass sheet, comprising an inner and an outer face,
  apply an enamel obscuration mask on at least one face of the at least one glass sheet to block a visual field from the outside of the automotive, the obscuration mask extending to an area wherein the at least one optical sensor device will be fixed, the obscuration mask comprising at least one opening on the automotive interior side so as to be capable of acquiring the information through the opening from the optical sensor device intended to be fixed on the at least one opening,
  dried or fired dry or fired the enamel obscuration mask (2),
  apply a washable cover layer resisting at a temperature of at least 620° C. on the surface of the at least one opening,
  submit the glass sheet to a heat treatment at a temperature above 450° C., preferably above 650° C., preferably during a bending or a tempering process,
  remove by washing the cover layer.

By adding a washable cover layer on the surface of the at least one opening provided within the obscuration mask before the bending or the tempering step, the optical results to a more uniform heat distribution across the part during the bending which reduces even eliminates the optical distortion caused by the thermal gradients. Thus, since the optical distortion due to the enamel obscuration mask is reduced even eliminated within the at least one opening, the optical sensor device intended to be fixed within the opening will work more efficiently without being impacted by the optical distortion in the called "camera zone".

According to the present invention, the washable cover layer resists at a temperature of at least 620° C. measured on the surface of the glass sheet by well-known technologies.

According to the present invention, the glass sheet provided with an enamel obscuration mask on at least one face of the at least one glass sheet and the washable cover layer according to the present invention, is submitted to a heat treatment at a temperature above 450° C., preferably above 650° C., preferably during a bending or a tempering process. The said temperature corresponds to the temperature measured in the furnace wherein the glass sheet is submitted to this kind of high temperature.

According to one embodiment of the present invention, the automotive glazing is a laminated glazing. The laminated glazing is preferably formed by at least one outer glass sheet and one inner glass sheet laminated with a thermoplastic interlayer.

In the case of a laminated glazing, the enamel obscuration frit mask is preferably provided on the inner face (P4) of the inner glass sheet.

According to one embodiment of the present invention, the washable cover layer covering the at least one opening provided within the enamel obscuration mask may extends partially from the peripheral edge of the opening toward the obscuration mask around the opening.

In a more particular embodiment, the washable cover layer covering the at least one opening provided within the enamel obscuration mask may extends partially from the peripheral edge of the opening toward the obscuration mask around the opening in a region corresponding to a range of 5 to 50 mm from the peripheral edge of the opening toward the obscuration mask layer around the opening.

According to one preferred embodiment of the present invention, the washable cover layer is a washable enamel free of frit or an ink or a suspension of mineral particles, resisting at a temperature of at least 620° C.

It is understood that the term "washable" means that the cover layer is made in a material that can be removed after a treatment of washing with water or any removing process such as mechanical brushing on glass surface that allows to remove the cover layer without deteriorating the enamel obscuration band.

According to one particular embodiment, the washable enamel resisting to a temperature of at least 620° C. may be an enamel free of frit (mixture of silica and fluxes which is fused at high temperature to make glass), like commercial product as "Contrast Coating®" or "Kontrast Print®". These kind of enamel may be used in combination with conventional glass enamels. The specificity of these kind of enamel is that they do not fuse to the glass surface during firing, but only to surface already covered by conventional enamel with frit.

In a preferred embodiment, the washable enamel is a white enamel free of frit. A known commercial white enamel is provided by the company Johnson Matthey under the reference PG000-654-63. The washable enamel covers preferably the at least one opening and extends partially from the peripheral edge of the opening toward the obscuration mask around the opening in a region corresponding to a range of 5 to 50 mm from the peripheral edge of the opening toward the obscuration mask layer around the opening.

Thus, the inventors have surprisingly shown that the optical distortion in the area wherein the optical sensor device will be fixed and more generally in the area surrounding the at least one opening is reduced significantly. It has been shown that the optical distortion in "the camera zone" may be reduced up to 50% even more in comparison with a glazing with the openings in the "camera zone" not covered by the washable enamel free of frit cover layer before the bending of the glazing.

It is understood the washable enamel may contain other pigments than white pigment. For example, the washable enamel cover layer may contain black pigment.

The washable enamel cover layer may be in the form of liquid or paste and may be applied by screen-printing or by spraying or by any suitable technology.

According to another embodiment of the present invention, the washable cover layer resisting at a temperature of at least 620° C. may be an ink.

According to another embodiment of the present invention, the washable cover layer resisting at a temperature of at least 620° C. may be a suspension of mineral particles. For example, the suspension of mineral particles may be a graphite-based solution (carbon powder). The graphite solution may be preferably sprayed only on the surface of the at least opening within the enamel obscuration mask without extending partially over the enamel obscuration mask. Thus, it has been shown that the optical distortion within the camera zone may be improved up to 40% even more in comparison with a glazing with the openings in the "camera zone" not covered by the ink washable cover layer before the bending of the glazing.

Thus, as mentioned above, depending on the type of washable cover layer used, the cover layer may be screen printed, or sprayed. The washable cover layer may be applied only in the zone delimited by the at least one opening provided in the obscuration mask and intended to receive the optical sensor device or may extends partially over the enamel obscuration mask.

According to the present invention, the washable mask layer is applied after at least a step of drying of the enamel obscuration mask at a temperature between 90° C. and 150° C.

According to one embodiment of the present invention, the washable mask layer is applied after a step of curing/firing of the enamel obscuration mask at a temperature above 550° C. during more than 10 seconds.

This embodiment is particularly interesting when the glazing should be stored before bending. The glazing provided with the enamel obscuration mask (with at least one opening for the optical sensor device) may be stored and when the glazing is intended to be bent then the washable cover layer is applied avoiding a damage of the enamel obscuration mask.

According to one embodiment of the present invention, the enamel obscuration mask may be applied on face 2 or face 3 or face 4 or face 2 and face 4. The position of the obscuration mask will depend on final aesthetics aspect required by the customer, or specific inserts or busbars or elements on glass to be hidden by blackband.

According to the present invention, the enamel obscuration mask is a black enamel frit comprising pigments, a carrier, binders and finely ground glass. Other materials are also sometimes added to enhance certain properties: the firing temperature, anti-stick, chemical resistance, etc. The black frit is applied to the glass using a silk screen or ink jet printing process prior to heating and bending. During the bending process, the finely ground glass in the frit soften and fuses with the glass surface. The frit is said to be "fired" when this takes place.

According to one embodiment of the present invention, the glazing produced by the method is an automotive windshield.

It is understood that the method according to the present invention may be applied for any laminated glazing on which an enamel obscuration mask is applied and comprising at least one opening on which an optical sensor device is intended to be fixed on.

In particular, the invention concerns a laminated glazing and particularly a windshield wherein the optical distortion is reduced even eliminated in the area wherein an optical sensor and particularly a camera is placed in at least one opening in the obscuration band and more particularly in the black ceramic band.

In particular, the invention concerns a laminated glazing and particularly a windshield wherein an optical sensor device is arranged on a surface of the glass sheet on the at least one opening on a vehicle interior side so as to be capable of acquiring the information through the opening.

According to the present invention, more than one opening may be provided within the enamel obscuration mask to receive more than one optical sensor device. The number of openings may depend on the number of optical sensor devices intended to be fixed on the glazing.

According to one embodiment of the present invention, the at least one optical sensor device is chosen amongst a camera, an Infrared camera, a Lidar and a laser pointer.

In a particular embodiment of the present invention, the optical sensor device is a camera.

The use of cameras, requiring a wide field of view and a high level of optical clarity, is also growing at a rapid rate with the introduction of vehicles capable of various levels of autonomous operation. The resolution of the cameras is also increasing at an equally fast rate. These typically must be mounted on the windshield in the wiper area. Early initial applications were for night-vision. Today, camera based systems are used to provide a wide array of safety functions including adaptive cruise control, obstacle detection, lane departure warning and support for autonomous operation. Many of these applications require the use of multiple cameras. A clear undistorted field of view, is especially critical for camera based systems to perform as intended. It is essential for these systems to be able to quickly differentiate between objects, capture text, identify signage, and operate with minimal lighting. Further, as the resolution of the cameras used increases the need for a clear distortion free field of view increases.

BRIEF DESCRIPTION OF THE DRAWINGS

FIG. 5b and FIG. 6b show the results obtained thanks to the present invention.

REFERENCE NUMERALS 1 laminated glazing
2. enamel obscuration frit mask
3. outer glass sheet
4. inner glass sheet
5. interlayer
6. optical device
7. 7'. field of view/opening
21. peripheral edge mask
22. center obscuration mask
23. wiper rest obscuration mask
25. washable cover layer
26. camera zone
P1: outer face of an outer glass sheet
P2: inner face of an outer glass sheet
P3: inner face of an inner glass sheet
P4: outer face of an inner glass sheet.

DETAILED DESCRIPTION OF THE INVENTION

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

For simplification, the numbering of the glass sheets in the description refers to the numbering nomenclature conventionally used for glazing. Thus, the face of the laminate which is in contact with the outside environment of the vehicle is known as face 1 and the surface in contact with the internal side i.e the passenger compartment of the vehicle, is called face 4.

To avoid any doubt, the terms "external" and "internal" refer to the orientation of the glazing during installation as glazing in a vehicle.

To avoid any doubt, the present invention concerns laminated glazing as well as tempered glazing even if the below description is more directed to a laminated glazing.

Thus, the present invention eliminates the drawbacks associated with the black frit obscurations of the prior art by masking the openings in the black frit obscuration with a washable enamel before the forming/bending step or tempering step. This allows for a more uniform heat distribution across the part during bending which reduces residual stresses and optical distortion caused by the thermal gradients.

The inventors have surprisingly shown that the optical distortion in the area wherein an optical sensor device will be fixed and more generally in the area surrounding the at least one opening is reduced significantly also known as the "camera zone". It has been shown that the optical distortion in "the camera zone" may be reduced up to 50% even more in comparison with a glazing with the openings in the "camera zone" not covered by the washable enamel free of frit cover layer before the bending of the glazing.

Another benefit of the process is the ability to fine tune the optical properties of the laminate.

In addition to the benefits to the finished laminate, the elimination of the non-uniform heating and high thermal gradient present in the black frit areas increases yields through the bending process.

Distortion in windshields is measured in terms of refractive power or optical power. Optical power is the change in the angular deviation along over distance. At a high enough level, it can result in noticeable optical distortion. The optical power is expressed in diopters or specifically in millidiopters in Automotive glazing domain.

$$D = \frac{a_1 - a_2}{\Delta X} * 1000 (mdpt)$$

Distortions in mdpt
Distortions in radian
Differention length (size of the projected object on the glazing) in meters $a_1$ and $a_2$ are the incidence angle of 2 parallel rays passing through the glazing. The difference between the 2 incidence angles is given the distortion in radian unit.

$\Delta X$ is the distance between the 2 parallel rays, also called the differential length, in meter unit.

D is the optical power, representation of the distortion in millidiopters (mdpt).

Most large windshield production lines utilize online automated inspection system which scan the glass and produce a heating map showing the optical distortion in diopters.

Figure 1:
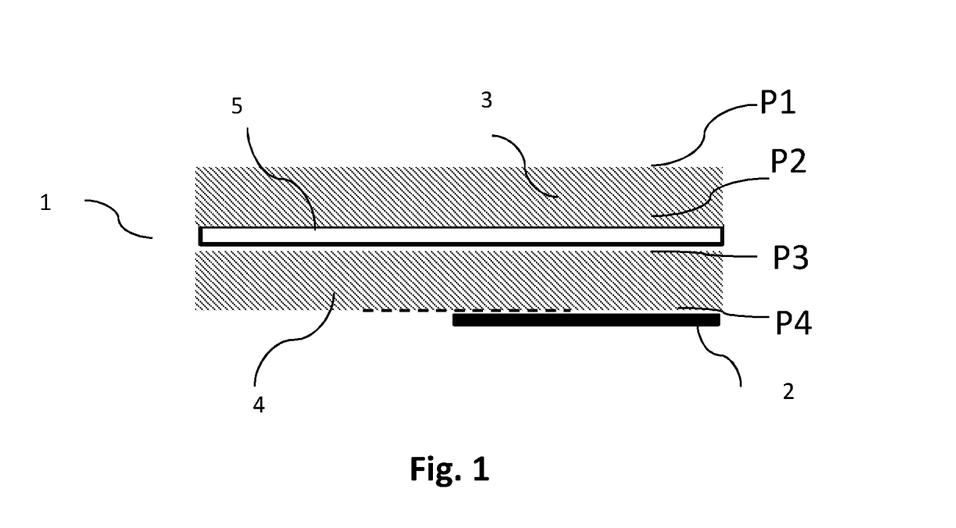
FIG. 1 show a typical automotive windshield 1 provided with an enamel obscuration frit mask 2 (more particularly a black band).
Figure 3:
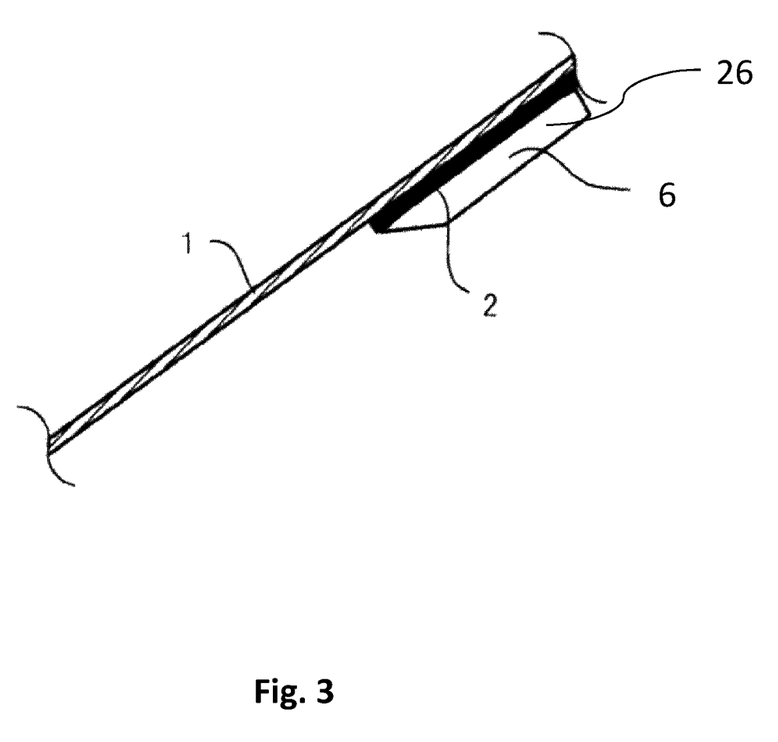
FIG. 3 shows an automotive windshield 1 on which a optical sensor 6 and more particularly a camera is placed behind an enamel obscuration frit mask 2 provided on the face 4 of the windshield.

According to an embodiment of the present invention, a windshield 1 to which a camera 6 or more generally speaking an optical sensor device 6 is attached (as shown in FIG. 3), will be described with reference to the drawings. The windshield 1 according to this embodiment and shown in FIG. 1 is laminated glazing in the form of a windshield 1 for a motor vehicle. The windshield comprises an outer glass sheet 3 having an outer face P1 and an inner face P2, an inner glass sheet 4 having an inner face P3 and an outer face P2, laminated together with a thermoplastic interlayer. A black enamel frit mask (band) 2 around the periphery of the windshield 1, called here after the "black band" is provided on the inner face P4 of the laminated glazing. The black band is an enamel frit mask as classically used in automotive field to mask unaesthetic part or to protect glue from U.V. it is understood that the enamel frit mask may have another masking color than black as for example a grey color or another suitable color to fulfill the requirement of the enamel obscuration frit mask.

Known glass sheets can be used as the outer glass sheet 3 and the inner glass sheet 4, and these glass sheets can also be made of IR absorbing glass, regular clear glass or green glass, or UV green glass. However, the glass sheets 3 and 4 are required to attain a visible light transmittance that conforms to the safety standards.

Although there is no particular limitation on the thickness of the laminated glass according to this embodiment, the total thickness of the outer glass sheet 3 and the inner glass sheet 4 is preferably set to 2.4 to 4.2 mm, more preferably 2.6 to 3.4 mm, and particularly preferably 2.7 to 3.2 mm, from the viewpoint of weight reduction.

Although the thickness of the inner glass sheet 4 can be made to be equal to that of the outer glass sheet 3, the thickness of the inner glass sheet 4 can be made to be smaller than that of the outer glass sheet 3 in order for example to reduce the weight of the laminated glass.

The interlayer 5 is a thermoplastic interlayer to laminate together the outer 3 and the inner 4 sheets. The interlayer 5 may be a well-known acoustic interlayer. The thermoplastic interlayer may be a single or multiple thermoplastic interlayers. Although there is no particular limitation on the materials constituting the layer 131 the interlayer layers 131 can be made of a polyvinyl butyral resin (PVB), for example. A polyvinyl butyral resin has excellent adhesiveness to the glass sheets and penetration resistance and is thus preferable.

As mentioned above, the laminated glass according to this embodiment is used in a windshield of an automobile using an optical sensor device or more particularly a camera. In the case of camera, the camera receives visible light or infrared rays from a preceding vehicle to take images, and measures the speed of a preceding automobile and the distance to the preceding automobile. Therefore, the laminated glass is required to achieve transmittance with respect to light having a wavelength in a predetermined range.

The camera may be an infrared camera to measure the speed of a preceding vehicle and the distance to the preceding vehicle, for example. In such a case, a useful transmittance with respect to light (infrared rays) having a wavelength of 700 to 800 nm is 30% or more and 80% or less, and preferably 40% or more and 60% or less.

The present invention proposes a method of manufacturing an automotive laminated glazing or a tempering glazing on which an optical sensor 6 and more particularly a camera 6 is attached, having superior optical quality. Another object of the present invention is to provide a method for reducing the optical distortion in a glazing comprising an enamel obscuration mask.

Figure 4:
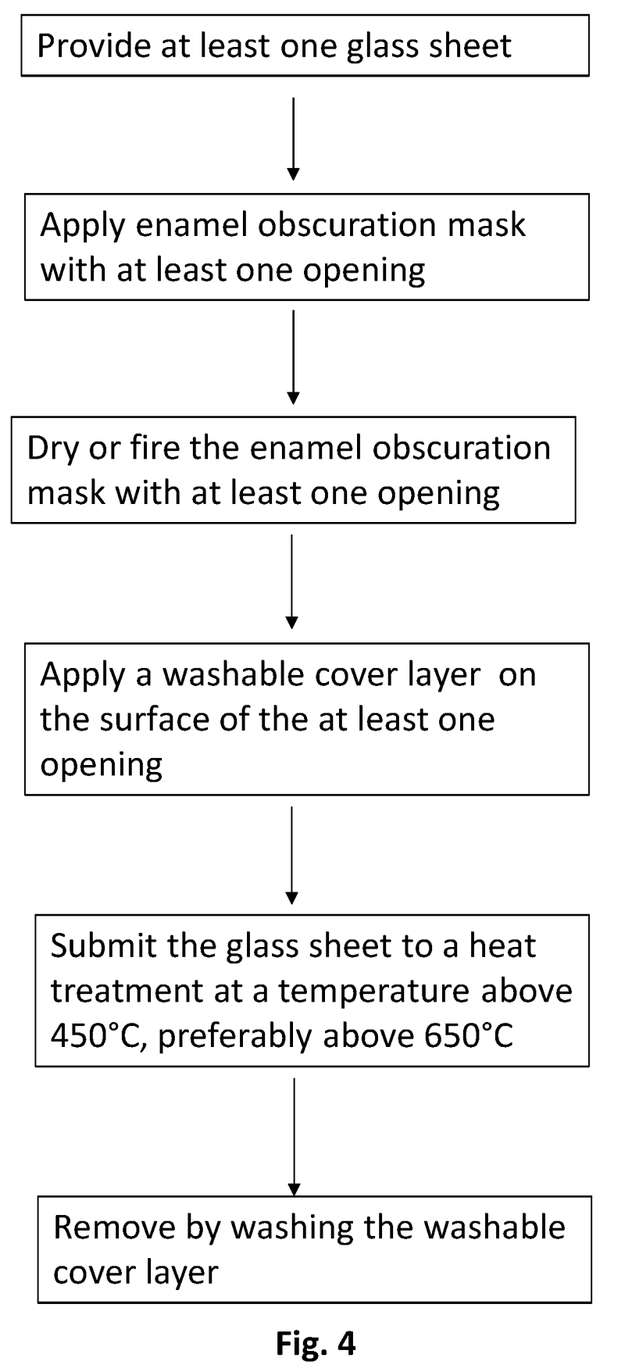
FIG. 4 shows a synoptic diagram of the method according to the present invention.

The method according to the present invention, may be summarized as in FIG. 4. The method according to the present invention comprises the following steps:
  a. provide at least one glass sheet;
  b. Apply an enamel obscuration mask with at least one opening wherein an optical sensor and more particularly a camera will be attached;
  c. Apply a washable cover layer resisting at a temperature of at least 620° C. on the surface of the at least one opening;
  d. Submit the at least one glass on which an enamel obscuration band with an opening recovered by the washable cover layer to a heat treatment such as a tempering or a bending/forming step; at a temperature above 450° C., and preferably above 750° C. in a furnace,
  e. Remove by washing the washable cover layer.

Figure 2:
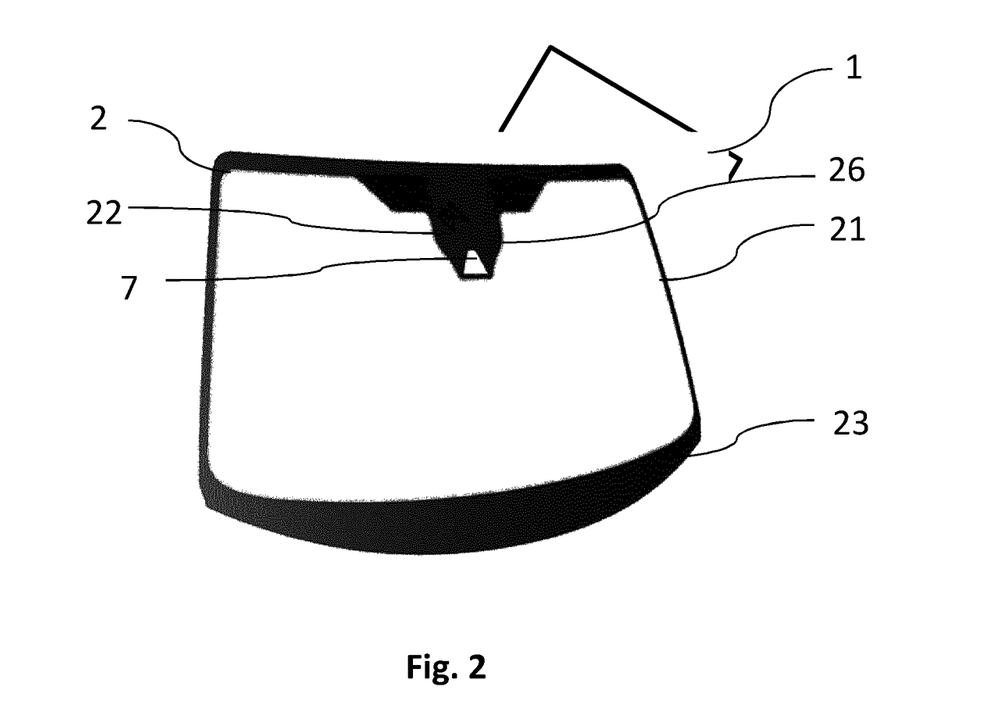
FIG. 2 shows an automotive windshield 1 with an enamel obscuration frit mask (black band) 2 extending along the lateral edges 21 of the windshield, a wiper rest obscuration 23 and an obscuration center mask 22 extending downward from the black band obscuration 2, having at least one opening 7 to provide a forward field of view for one camera.

According to one embodiment of the present invention, the automotive glazing is a laminated windshield 1 provided with enamel obscuration band 2 on the outer face of the inner face ie face 4 of the glazing (P4 of the FIG. 1). As shown in FIG. 2, FIG. 5 and FIG. 6, a mask layer 2 is formed on the edge of the glass sheet keeping an opening 7 in the place wherein the "camera bracket" wherein the camera will be attached. The glass sheet having a flat shape on which a mask layer has been formed is expected to be heated bent at the form requested by the car maker, according to known technologies. Glass sheets 3, 4 are molded into a curved shape using a mold. The mold used to bend the glass sheet is arranged on a conveyance base which passes through the inside of the heating furnace at a temperature comprised between 200° C. and 750° C. to cure the mask layer and to bend the glass sheet. In the case of a laminated glazing, the outer and the inner glass sheets may be bent separately (sheet-by-sheet process) or together (full press process) by superposing the two glass sheets. The curved shape may have a curvature only in a single direction or curvatures in a plurality of directions. Then, a windshield is obtained by performing annealing outside the heating furnace.

The first mask layer 2 as shown in FIG. 2 is formed adjacent to the glass sheet 1. The mask layer 2 serves as a region for concealing, from the outside, an adhesive that is applied to attach the glass sheet 1 to a vehicle body, and the like, and includes a peripheral edge mask layer 21 that is formed at the outer peripheral edge of the glass sheet 1 and a center mask layer 22 that extends downward from the peripheral edge mask layer 21 at the center of the upper edge of the glass sheet 1 also classically called the camera zone. The above-described measurement unit 6 is attached to the center mask layer 22. It is sufficient if the measurement unit 6 is arranged such that light emitted by a sensor 5 passes through the center of an opening and light reflected by a preceding vehicle and an obstacle can be received. Although the mask layer 2 can be made of various materials, there is no limitation on the materials as long as the mask layer 2 can block a visual field from the outside of the vehicle, and the mask layer 2 can be formed by applying ceramic of a dark color such as black to the glass sheet 1, for example.

In FIG. 2 as an example of the present invention, the center mask layer 22 is formed in a "rectangular-like" shape that extends vertically, and an opening 7 is formed in a trapezoidal shape to form a field of view for the optical sensor and more particularly for the camera 6.

It is understood that the center mask layer 22 may be formed in any suitable form that extends vertically, and where more than one opening (7, 7', 7") are formed according to number of cameras to be attached to the glazing. The opening may be lined up in the vertical direction, namely an upper opening and a lower opening or in the horizontal direction as shown in FIG. 5 and FIG. 6, in the center mask layer 22. The openings may have a trapezoidal shape or any suitable form adapted for the field of view of the camera. The openings may have an "open form" as a "inverse V-like" shape or a trapezoidal form(closed form). If more than one opening 7 are provided in the center mask layer 22, then the openings may have the same or different forms. (closed form). It is understood that there is no particular limitation on the sizes of the openings, the upper opening 231 can be formed so as to have a longitudinal length of about 58 mm and a lateral length of about 58 mm, and the lower opening can be formed so as to have a longitudinal length of about 52 mm and a lateral length of about 27 mm.

According to the present invention, once the enamel obscuration mask 2 is applied, the glass sheet is submitted to a heat treatment to cured or dried the enamel. According to the type of the washable cover layer 25 that will be used, the enamel mask 2 should be dried or cured. Indeed, for some washable cover layer 25 it is better to apply them after the enamel obscuration mask 2 is cured. However, some washable cover layer 25 may be applied quickly after the enamel obscuration mask 2 is dried allowing a gain of time. This depends on the composition of the washable cover layer 25 and more particularly if it contents some components that interact with the enamel mask 2 not cured.

According to the present invention, the washable cover layer 25 may be applied to cover only the at least one opening as shown in FIG. 6a. However, the washable cover layer 25 may be applied to cover the at least one opening and to extend partially from the peripheral edge of the opening toward the obscuration mask 2 around the opening 7, 7', 7" in for example a region corresponding to a range of 5 to 50 mm from the peripheral edge of the opening toward the obscuration mask layer 2 around the opening.

According to the present invention, the cover layer 25 may be applied by any suitable and known method as by spraying, screen printing.

Figure 5A:
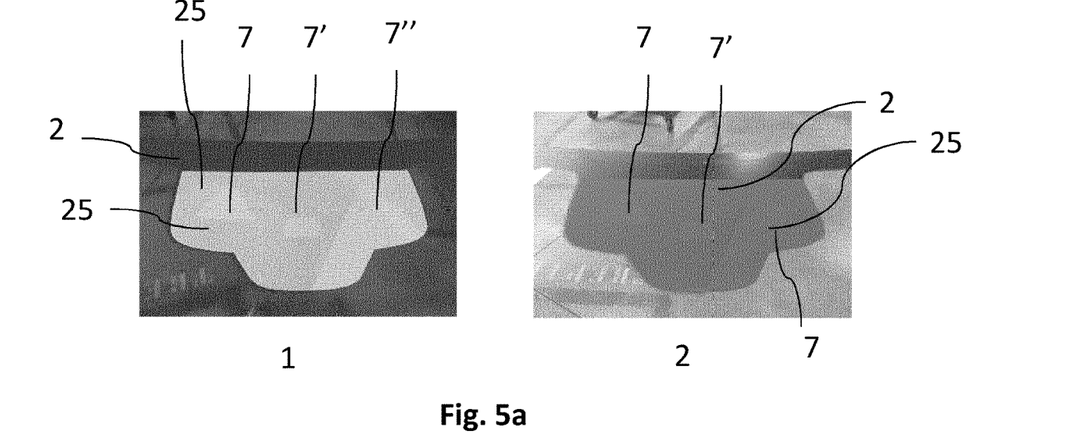
FIG. 5a shows a masking of the camera zone comprising three openings 7, 7', 7" with a white (FIG. 5a-1) or black (FIG. 5a-2) washable enamel according to one embodiment of the present invention and the improvement of optical distortion in the "camera zone".
Figure 6:
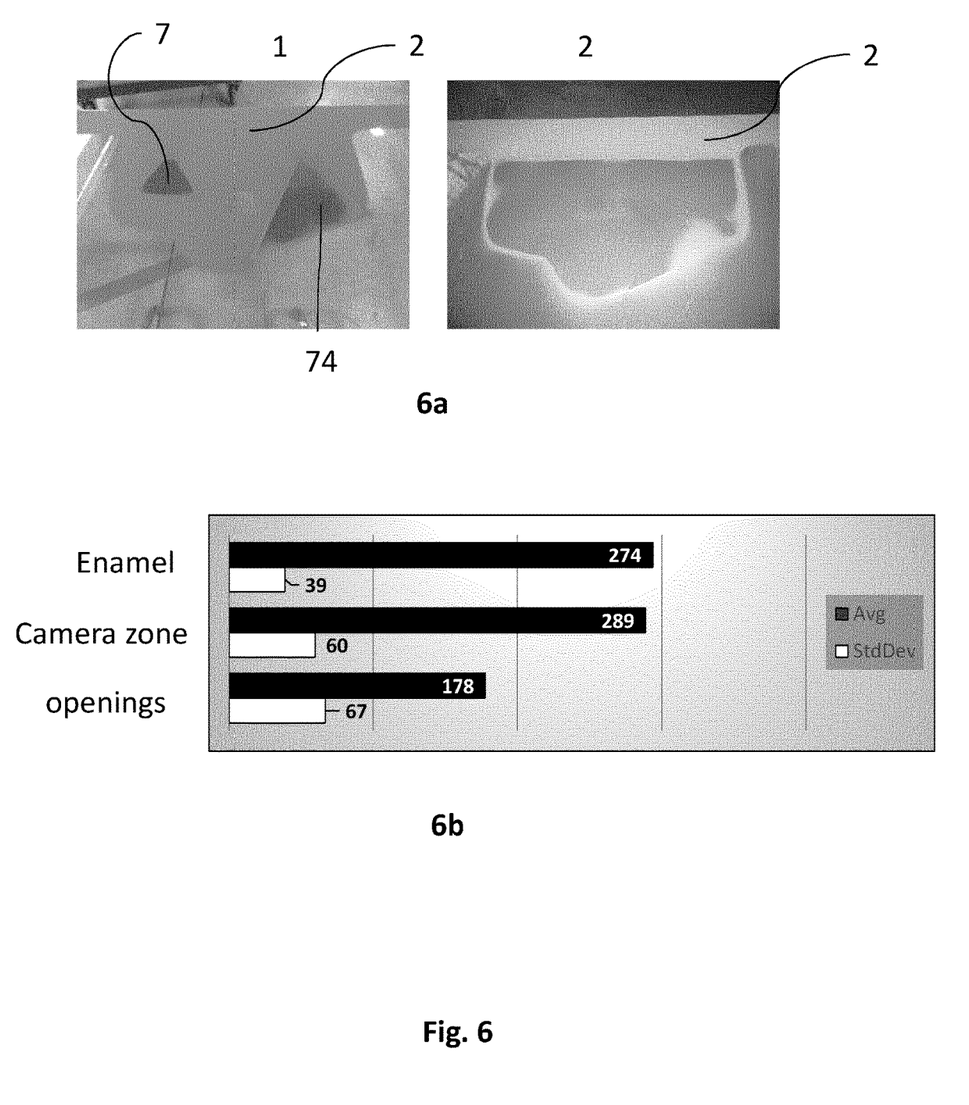
FIG. 6a and FIG. 6b shows a masking of 2 openings 7, 7', provided with a solution of dissolved carbon powder sprayed only on the surface of the opening 7, 7' (FIG. 6a-i) or on a surface covering the openings 7, 7' and partially the enamel obscuration band 2 (FIG. 6a-2) washable enamel according to one embodiment of the present invention and the improvement of optical distortion in the "camera zone".

FIG. 5a-1 shows an embodiment according to which the camera zone 26 in the centre obscuration mask 22 is covered by an enamel free of frit 2 containing white pigments. The washable cover layer 25 has been sprayed to cover the opening 7, 7', 7", the washable cover layer 25 extending and partially from the peripheral edge of the opening toward the obscuration mask 2 around the opening 7, 7', 7". The washable cover layer 25 has been applied on the centre obscuration mask 22 after the centre obscuration mask 22 has been applied and dried at a minimum temperature 90° C. on the inner face P4 of the inner glass sheet 4. Once the enamel free of frit 2 containing white pigments has been applied on face P4, the glass sheet has been submitted to a bending process, the temperature of the glass sheet reaching a temperature of at 620° C. during minimum 40 seconds to give the final shape of the glass sheet. After the bending step, the washable cover layer 25 has been removed by washing/brushing. After the outer 3 and the inner 4 glass sheet are bent together (full press) or separately (sheet-by-sheet), the two glass sheets 3, 4 are laminated together with a thermoplastic interlayer such as PVB. The lamination is performed according to well-known technologies. Thus, the laminated glass according to this embodiment is manufactured.

Then, the optical distortion has been measured in the camera zone on the laminated glazing obtained and compared to a classical laminated glazing provided with a black enamel obscuration band 2 having openings 7, 7', 7".

FIG. 5a-2 shows another embodiment of the present invention wherein an enamel without frit washable cover layer 25 comprising black pigments has been sprayed as for FIG. 5a-1 and submitted as for FIG. 5a-1 to a heat treatment during the bending process. The optical distortion has been also measured in the camera zone and compared to a glass sheet provided with a black enamel obscuration band 2 having openings 7, 7', 7".

Figure 5B:
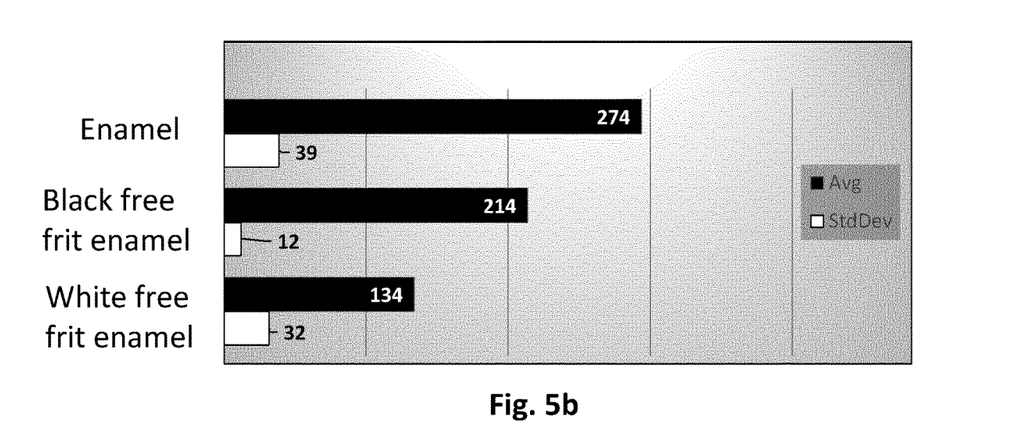

Thus, the FIG. 5b shows the results of optical distortion measured from a glass provided with a black enamel obscuration band 2 having openings 7, 7', 7" not covered by the washable cover layer 25, glass provided with a black enamel obscuration band 2 having openings 7, 7', 7" covered by an washable cover layer 25 comprising white and black pigments. The values indicated in FIG. 5b are expressed in mdpt. Thus, by covering the openings with a black washable cover layer 25, the optical distortion has been improved by 15% in comparison with a glass sheet provided with a black enamel obscuration band 2 having openings 7, 7', 7" not covered by a washable cover layer 25. By covering the openings with a white washable cover layer 25, the optical distortion has been improved up to 50% in comparison with a glass sheet provided with a black enamel obscuration band 2 having openings 7, 7', 7" not covered by a washable cover layer 25.

According to another embodiment of the present invention as shown in FIG. 6a-i, a solution comprising carbon powder ie washable cover layer 25, has been sprayed only on the surface of the openings 7, 7', 7" after the obscuration mask 2 has been screen printed and dried as for examples described above ie on P4 of the glass sheet.

According to another embodiment as shown in FIG. 6a-2, a solution comprising carbon powder has been sprayed only on the surface of the openings 7, 7', 7", the washable cover layer 25 extending and partially from the peripheral edge of the opening toward the obscuration mask 2 around the opening 7, 7', 7".

Thus, the FIG. 6b shows the results of optical distortion measured from a glass provided with a black enamel obscuration band 2 having openings 7, 7', 7" not covered by the washable cover layer 25, glass provided with a black enamel obscuration band 2 having openings 7, 7', 7" covered by a suspension of carbon powder dissolved and with a glass with openings and partially black enamel obscuration band 2 are covered The values indicated in FIG. 5b are expressed in mdpt Thus, by covering the openings with a solution comprising a carbon powder dissolved as washable cover layer 25, the optical distortion has been improved up to 40% in comparison with a glass sheet provided with a black enamel obscuration band 2 having openings 7, 7', 7" not covered by a washable cover layer 25.

The present invention concerns also a glazing obtained by a method according to the present invention.

The invention claimed is:

1. A method for producing an automotive glazing comprising an optical sensor device, the method comprising:
    providing at least one glass sheet,
    applying an enamel obscuration mask on at least one face of the at least one glass sheet to block a visual field from an outside of an automobile, the enamel obscuration mask extending to an area wherein the at least one optical sensor device will be fixed, the enamel obscuration mask comprising at least one opening on an automotive interior side so as to be capable of acquiring information through the at least one opening from the optical sensor device fixed on the at least one opening,
    drying or firing the enamel obscuration mask,
    applying a washable cover layer resisting at a temperature of at least 620° C. on the
    surface of the at least one opening, wherein the washable cover layer extends partially from a peripheral edge of the at least one opening towards the obscuration mask around the at least one opening in a region corresponding to 5 to 50 mm from the peripheral edge of the at least one opening,
    submitting the glass sheet with the washable cover layer thereon to a heat treatment at a temperature above 450° C. during a bending or a tempering process,
    removing the washable cover layer by washing the cover layer.

2. The method according to claim 1, wherein the automotive glazing is a laminated glazing formed by at least one outer glass sheet and one inner glass sheet laminated with a thermoplastic interlayer.

3. The method according to claim 2, wherein the enamel obscuration mask is applied on the inner face of the outer glass sheet, or on an inner or outer face of the inner glass sheet, or both.

4. The method according to claim 1, wherein the washable cover layer is a washable frit-free enamel, an ink, or a suspension of mineral particles, resisting at a temperature of at least 620° C.

5. The method according to claim 1, wherein the washable cover layer is applied by screen printing or spraying.

6. The method according to claim 1, wherein the washable mask layer is applied after the drying the enamel obscuration mask at a temperature between 90° C. and 150° C.

7. The method according to claim 1, wherein the washable mask layer is applied after the firing of the enamel obscuration mask at a temperature above 550° C. for more than 10 seconds.

8. The method according to claim 1, wherein the enamel obscuration mask is a black enamel.

9. The method according to claim 1, wherein the glazing is a windshield.

10. The method according to claim 1, wherein the glass sheet is submitted to a heat treatment at a temperature above 650° C. during a bending or a tempering process.

* * * * *